UNITED STATES PATENT OFFICE.

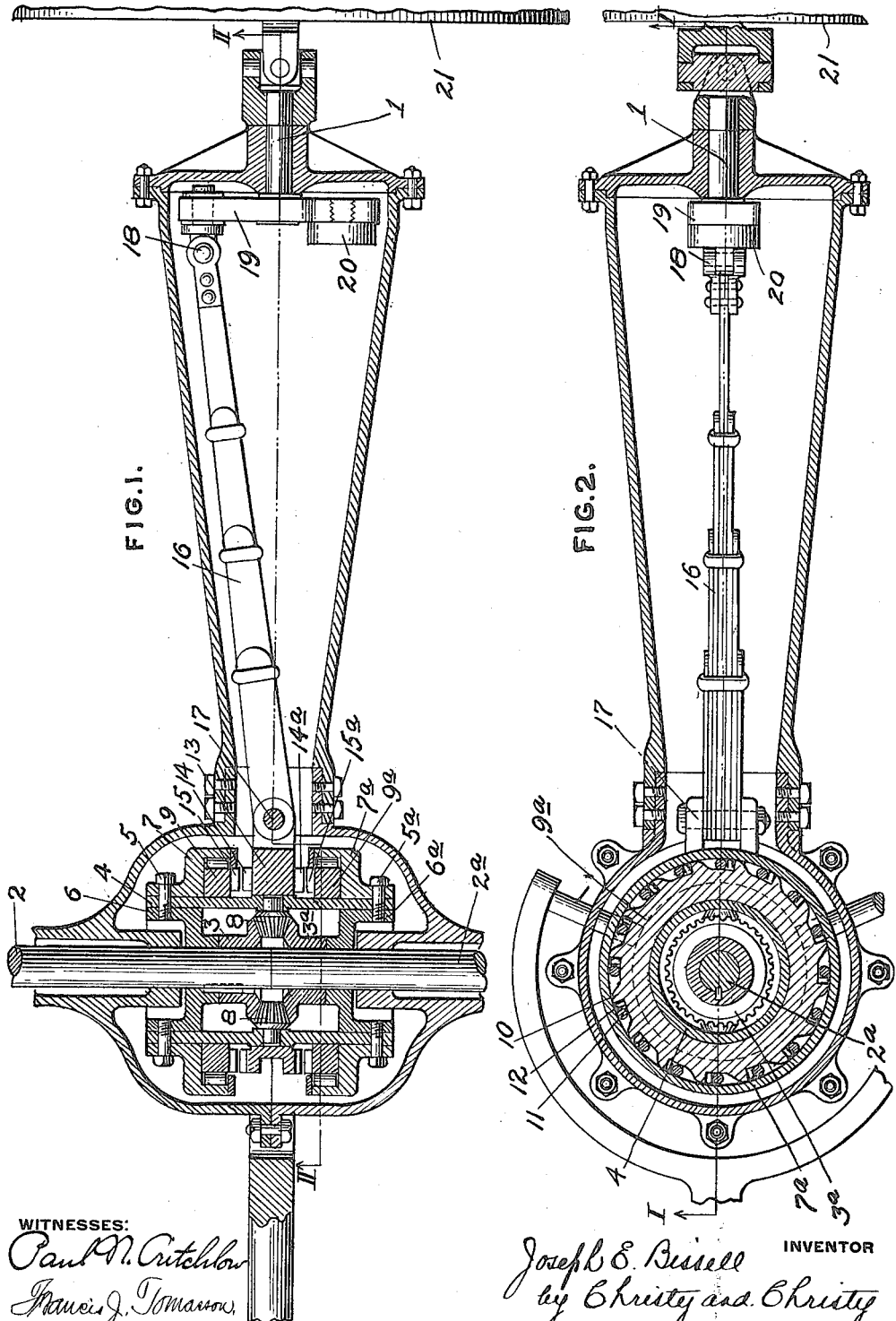

JOSEPH E. BISSELL, OF PITTSBURGH, PENNSYLVANIA.

TRANSMISSION MECHANISM.

1,141,228.   Specification of Letters Patent.   Patented June 1, 1915.

Application filed August 20, 1913. Serial No. 785,764.

*To all whom it may concern:*

Be it known that I, JOSEPH E. BISSELL, residing at Pittsburgh, in the county of Allegheny and State of Pennsylvania, a citizen of the United States, have invented or discovered certain new and useful Improvements in Transmission Mechanism, of which improvements the following is a specification.

The object of my present invention is to provide a transmission mechanism whereby an increase in the load or resistance will not stall the engine.

A further object of my invention is to so construct such a mechanism that it may be readily applied as a simple automatic reduction gear to the present day automobile construction.

In the accompanying drawing, which forms part of my specification, I have illustrated one embodiment of my invention in its application to automobile driving mechanism.

Figure 1 is a horizontal sectional view through the rear driven axle of an automobile and my improved transmission mechanism, the plane of section being indicated by the line I—I, Fig. 2; and Fig. 2 is a vertical sectional view taken on the line II—II, Fig. 1.

Like numerals are used to designate like parts.

Referring to the embodiment of my invention illustrated in the drawings, the rear end of the driving shaft is indicated at 1, the opposite end thereof being connected to an engine in the usual manner, and the central portion of the driven axle or shaft is indicated at 2, 2$^a$, the outer ends thereof being suitably secured to driving wheels. Neither the engine nor the driving wheels, the constructions of which are well known, are illustrated in the drawings. As will be readily seen, the two shafts 1 and 2, 2$^a$ lie in substantially the same plane and are arranged transversely with relation to each other, the shaft 1 terminating at a substantial distance from the shaft 2, 2$^a$.

In order to transmit rotary movement from the driving to the driven shaft, I provide the driven shaft with a reversible clutch, one member of which has an arcuate movement about the center of the driven shaft and is eccentrically connected to the driving shaft through a spring arm, the arrangement being such that said clutch member, when adjusted to one position is effective when moving in one direction to apply power to the driven shaft; and further the arrangement is such that the spring arm will, when the resistance to the driven shaft reaches a predetermined amount, yield and allow the engine to run, rather than stall it.

Having reference first to the specific construction of the clutch mechanism illustrated herein, and subsequently to the spring-arm connection, the driven shaft is constructed of two parts 2 and 2$^a$, their adjacent ends being provided with differential pinions 3 and 3$^a$, respectively. Surrounding the pinions 3 and 3$^a$ there is a cylindrical casing member 4, which has a plurality of idler differential pinions 8 rotatably mounted in the interior thereof, and which is secured by bolts 5 to a double-flanged sleeve 6 keyed in turn to the shaft portion 2. A pair of double flanged sleeves 7, and 7$^a$ are secured to the exterior face of the cylinder 4 at opposite ends thereof by bolts 5 and 5$^a$, respectively, and a sleeve 6$^a$, rotatably mounted upon the shaft portion 2$^a$, is also secured to said cylinder. The sleeves 6, 6$^a$, 5, 5$^a$ and the cylinder 4, being connected into a rigid member, form a clutch casing, or fixed clutch member. A pair of rings 9 and 9$^a$ are rotatably mounted upon the cylinder 4, and extend beneath the flanges of the sleeves 7 and 7$^a$, respectively. The peripheries of the rings 9, 9$^a$ are provided with notches 10 having inclined faces on one side thereof, there being a friction roller 11 between each pair of adjacent notches, such roller being held yieldingly against the inclined face of the notch by a spring 12. The arrangement in this regard is such that, when a ring 9 or 9$^a$ is rotated in one direction upon the cylinder 4, the rollers will be wedged between the inner surface of a sleeve flange 7 or 7$^a$ and cause the clutch casing and shaft 2, 2$^a$ to revolve, but when such ring is revolved in the opposite direction, it will rotate freely within its sleeve flange 7 or 7$^a$. The notches 10 on the ring 9 are arranged in the opposite direction to those on the ring 9$^a$, so that the shaft 2, 2$^a$, may be rotated in either direction.

In order to drive the rings 9 and 9$^a$, a clutch ring 13 is rotatably mounted on the cylinder 4 between said rings, and is slidable upon the cylinder to and from engagement with one or the other thereof. Said clutch ring is provided on its sides with teeth 14 and 14ᵃ adapted to coöperate with and engage teeth 15 and 15ᵃ, formed on the sides of the rings 9 and 9ᵃ, respectively.

The clutch ring 13 is connected to the driving shaft 1 by means of an arm 16, such ring being caused to reciprocate through an arcuate path upon the cylinder 4, carrying the cylinder with it when moving in one direction and sliding upon the cylinder when moving in the opposite direction. To such an end the arm 16 is pivoted, as at 17, to the ring 13, the axis of the pivot being at right angles to the center line or axis of the ring. The opposite end of the arm 16 is connected, through a universal joint 18 to a crank arm 19, secured to the shaft 1, and provided with a suitable counterweight 20. As the driving shaft 1 rotates the end of the arm 16 connected thereto moves in a circular path, and the opposite end of said arm reciprocates in an arcuate path carrying with it the clutch ring 13.

The arm 16 is formed of a leaf spring so proportioned that it will deflect and permit the driving shaft 1 to continue its rotation when the load or resistance to the driven shaft 2, 2ᵃ is of sufficient strength to stall the engine if such yielding drive were not present. In order to prevent the dissipation of the energy consumed in thus deflecting the spring, as well as to balance the running of the engine, a fly wheel 21 is mounted upon the driving shaft.

In operation, assuming that the clutch ring 13 has been moved to and is securely held in engagement with the ring 9ᵃ, the rotation of the shaft 1 will, under a normal load cause the outer end of the arm 16 to move in the path of a circle and its inner end to reciprocate in an arcuate path. The clutch ring 13 will thereby be reciprocated, the clockwise movement thereof being effective through ring 9ᵃ, sleeve 7ᵃ, cylinder 4, and sleeve 6 to rotate the shaft 2, 2ᵃ in the same direction. As the ring 9ᵃ moves in the opposite or counter-clockwise direction it will not engage the flange 7ᵃ but will slide freely upon the surface of the cylinder 4.

By shifting the clutch ring 13 into engagement with the ring 9, the rotation of the shaft 2, 2ᵃ may be reversed.

It is characteristic of my invention that the extent of reciprocation of the clutch ring 13 varies indirectly to the load applied to the driven shaft 2, 2ᵃ. Such being the case, an automatic reduction gear is effected, the energy consumed in deflecting the spring arm 16 in each half revolution of the driving shaft 1 being stored in the fly-wheel 21 on the other half revolution of said shaft.

I claim herein as my invention:

1. In a transmission, the combination with a rotary driving shaft, and a rotary driven shaft having its axis substantially at right angles to that of the driving shaft; of a clutch having one member thereof mounted for arcuate movement upon and adapted to operatively engage the driven shaft, and a spring arm eccentrically connected at one end through a universal joint to the driving shaft and pivotally secured at its other end to said clutch member, the pivot axis being substantially at right angles to the axis of the driven shaft, said arm being transversely yielding but longitudinally rigid.

2. In a transmission mechanism, the combination with a rotary driving shaft, and a rotary driven shaft transversely disposed to said driving shaft; of a clutch casing secured to said driven shaft and rotatable therewith, a pair of clutch rings rotatably mounted upon and each adapted when moved in opposite directions to engage said clutch casing, and a supplementary clutch ring rotatably mounted upon said casing between said first mentioned rings and adapted to engage one or the other thereof, and a spring arm pivoted at one end to said ring and eccentrically connected through a universal joint to said driving shaft.

In testimony whereof I have hereunto set my hand.

JOSEPH E. BISSELL.

Witnesses:
PAUL N. CRITCHLOW,
FRANCIS J. TOMASSON.

Copies of this patent may be obtained for five cents each, by addressing the "Commissioner of Patents, Washington, D. C."